US010277935B2

(12) United States Patent
Flaharty et al.

(10) Patent No.: US 10,277,935 B2
(45) Date of Patent: *Apr. 30, 2019

(54) METHOD AND APPARATUS FOR HARDWARE-ENFORCED, ALWAYS-ON INSERTION OF A WATERMARK IN A VIDEO PROCESSING PATH

(71) Applicant: INSIDE SECURE S.A., Meyreuil (FR)

(72) Inventors: Dennis R. Flaharty, Shingle Springs, CA (US); Ronald P. Cocchi, Seal Beach, CA (US); Gregory J. Gagnon, Redondo Beach, CA (US); Michael A. Gorman, Cypress, CA (US); Jacob T. Carson, Long Beach, CA (US)

(73) Assignee: INSIDE SECURE S.A., Meyreuil (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,772

(22) Filed: Mar. 27, 2018

(65) Prior Publication Data
US 2018/0220177 A1 Aug. 2, 2018

Related U.S. Application Data

(63) Continuation of application No. 15/167,319, filed on May 27, 2016, now Pat. No. 9,942,586, which is a
(Continued)

(51) Int. Cl.
G06K 9/00 (2006.01)
H04N 21/254 (2011.01)
(Continued)

(52) U.S. Cl.
CPC ....... *H04N 21/2541* (2013.01); *G06T 1/0021* (2013.01); *H04N 5/913* (2013.01);
(Continued)

(58) Field of Classification Search
USPC .......................................... 382/100
See application file for complete search history.

(56) References Cited

U.S. PATENT DOCUMENTS 9,942,586 B2 * 4/2018 Flaharty et al. ... H04N 21/2541
382/100
2001/0037465 A1 11/2001 Hart, III et al.
(Continued)

OTHER PUBLICATIONS

PCT International Search Report and Written Opinion dated May 11, 2012 for PCT/US2012/022791.

*Primary Examiner* — Alex Kok S Liew
(74) *Attorney, Agent, or Firm* — Gates & Cooper LLP

(57) ABSTRACT

A method, apparatus, article of manufacture, and a memory structure for inserting a watermark in a media program is described. In an exemplary embodiment, the method comprises the steps of receiving data comprising the media program in the receiver disposed at a subscriber station, generating a watermark, the watermark generated at least in part according to a secure data processor-unique identifier irreversibly stored in the secure data processor, processing the received data to reproduce the media program, and inserting portions of the generated watermark in the reproduced media program at locations determined at least in part according to the secure data processor-unique identifier to produce a watermarked media program provided for display.

35 Claims, 11 Drawing Sheets

Related U.S. Application Data continuation of application No. 13/981,289, filed as application No. PCT/US2012/022791 on Jan. 26, 2012, now Pat. No. 9,355,426.

(60) Provisional application No. 61/436,485, filed on Jan. 26, 2011.

(51) Int. Cl.
| | |
|---|---|
| H04N 5/913 | (2006.01) |
| H04N 21/426 | (2011.01) |
| H04N 21/433 | (2011.01) |
| H04N 21/4627 | (2011.01) |
| H04N 21/8358 | (2011.01) |
| G06T 1/00 | (2006.01) |
| H04N 21/438 | (2011.01) |
| H04N 21/845 | (2011.01) |
| H04N 9/804 | (2006.01) |
| H04N 9/806 | (2006.01) |

(52) U.S. Cl.
CPC ..... *H04N 21/42684* (2013.01); *H04N 21/438* (2013.01); *H04N 21/4334* (2013.01); *H04N 21/4627* (2013.01); *H04N 21/8358* (2013.01); *H04N 21/845* (2013.01); *G06T 2201/0064* (2013.01); *H04N 9/8042* (2013.01); *H04N 9/8063* (2013.01); *H04N 2005/91335* (2013.01)

(56) References Cited

U.S. PATENT DOCUMENTS

| | | |
|---|---|---|
| 2002/0105839 A1 | 8/2002 | Sugahara et al. |
| 2002/0136428 A1 | 9/2002 | Sugahara et al. |
| 2003/0163706 A1 | 8/2003 | Cocchi et al. |
| 2005/0210523 A1 | 9/2005 | Parnell et al. |
| 2006/0005029 A1 | 1/2006 | Petrovic et al. |
| 2006/0137015 A1 | 6/2006 | Fahrny et al. |
| 2006/0239501 A1 | 10/2006 | Petrovic et al. |
| 2006/0239502 A1 | 10/2006 | Petrovic et al. |
| 2006/0239503 A1 | 10/2006 | Petrovic et al. |
| 2010/0269146 A1 | 10/2010 | Britt |

* cited by examiner

| 0000=0 704A | 0100=4 704E | 1000=8 704I | 1100=C 704M |
|---|---|---|---|
| 0001=1 704B | 0101=5 704F | 1001=9 704J | 1101=D 704N |
| 0010=2 704C | 0110=6 704G | 1010=A 704K | 1110=E 704O |
| 0011=3 704D | 0111=7 WM Placement Intervals: 1 704H | 1011=B 704L | 1111=F 704P |

METHOD AND APPARATUS FOR HARDWARE-ENFORCED, ALWAYS-ON INSERTION OF A WATERMARK IN A VIDEO PROCESSING PATH

CROSS-REFERENCE TO RELATED APPLICATIONS

This application is a continuation of U.S. patent application Ser. No. 15/167,319, entitled "METHOD AND APPARATUS FOR HARDWARE-ENFORCED, ALWAYS-ON INSERTION OF A WATERMARK IN A VIDEO PROCESSING PATH," by Dennis R. Flaharty et al., filed May 27, 2016, now issued as U.S. Pat. No. 9,942,586, which application is a continuation of National Stage application Ser. No. 13/981,289, entitled "HARDWARE-ENFORCED, ALWAYS-ON INSERTION OF A WATERMARK IN A VIDEO PROCESSING PATH," by Dennis R. Flaharty et al., filed Jul. 23, 2013, now issued as U.S. Pat. No. 9,355,426, which application is a National Stage of International Application No. PCT/US2012/022791, entitled "HARDWARE-ENFORCED, ALWAYS-ON INSERTION OF A WATERMARK IN A VIDEO PROCESSING PATH," by Dennis R. Flaharty et al., filed Jan. 26, 2012, which application claims benefit of U.S. Provisional Patent Application No. 61/436,485, entitled "ALWAYS ON, HARDWARE ENFORCED WATERMARK," by Dennis R. Flaharty et al., filed Jan. 26, 2011, all of which applications are hereby incorporated by reference herein.

BACKGROUND OF THE INVENTION

1. Field of the Invention

The present invention relates to systems and methods for protecting the unauthorized dissemination of data, and in particular to a system and method for watermarking data for later forensic retrieval.

2. Description of the Related Art

Movie studios and other owners of the intellectual property in media programs such as movies, television programs, audio programs and the like have been attempting, without success, to mandate the use of watermarking to aid forensic analysis of pirated materials.

Digital watermarking is one technique that can help protect such intellectual property. Digital watermarking is a process by which information in the signal itself can be used to verify the authenticity or identity of the owners or to trace the source of a media program. Watermarking may include visible or invisible watermarking. With visible watermarking, the information discernable in the media program without special equipment. An example of a digital watermark is a logo or bug that might be placed in the corner of one or more frames of the media program. With invisible watermarking, the information is added to the media program in such a way that it cannot be easily perceived without special equipment.

Watermarking can prevent unauthorized copying or distribution of media programs in two ways. First, a watermark can be inserted into the media program, and retrieved and examined before any copy of the media program is permitted. In this example, if the watermark cannot be retrieved, or if the retrieved watermark indicates that copying is not permitted, copying is disabled. Second, a watermark may also allow the owner to perform source tracing to determine where the unauthorized copy was procured. In this system, a watermark is embedded into the media program at each point of distribution or copying. If an unauthorized copy of the work is later found, the watermark(s) may be retrieved, and the chain of distribution can be identified back to the source of the unauthorized copy.

To date, several companies have marketed watermarking technologies but without much success in the market due to several significant technical and economic reasons such as design complexity and high operational overhead. For these reasons, the broadcasters of such media programs have not adopted watermarking technologies even though those who own the intellectual property are pushing strongly for adoption of a solution. A simple, low cost, and near zero broadcast infrastructure impact design can address this problem.

The current providers of watermarking technology either have (1) large clients disposed at the headend (transmitting facility) and lighter set top box (STB) or receiver software kernels at the subscriber facility or (2) lighter headend clients with larger and more sophisticated STB kernel clients. In either case there is a high level of complexity and cost to gather identifiable forensic data. Some of these complexities include finding the appropriate space in the video to insert the data while keeping the watermark as invisible as possible so as to avoid disrupting the viewing experience, redesigning the broadcasters headend to integrate a set of watermarking servers and adding a large software kernel to the STB code and re-qualify the STB code to verify correct operation of new and old functionality. In some current watermarking designs after the broadcast and STB systems are re-designed there are sophisticated retrieval process and procedures needed to be developed to capture the data from pirated materials in order to recover the forensic data.

All of these systems come at a high cost. Some watermarking companies require payment of substantial fees such as Non-Recurring Engineering (NRE) effort fees to obtain or use the required headend client, STB kernel client and forensic retrieval clients. They also require fees for keying materials or per usage licenses. All of which are burdensome to the broadcaster/customer.

What is needed is a system and method for securely and effectively watermarking media programs at a reduced cost. The present invention satisfies that need.

SUMMARY OF THE INVENTION

To address the requirements described above, the present invention discloses a method and apparatus for adding watermark data to a media program in a receiver having a secure data processor. In one embodiment, the method comprises the steps of receiving data comprising the media program in the receiver disposed at a subscriber station, generating a watermark, the watermark generated at least in part according to a secure data processor-unique identifier irreversibly stored in the secure data processor, processing the received data to reproduce the media program, and inserting portions of the generated watermark in the reproduced media program at locations determined at least in part according to the secure data processor-unique identifier to produce a watermarked media program provided for display. In another embodiment, the apparatus is evidenced by a receiver for adding watermark data to a media program which comprises a tuner for receiving data comprising the media program in the receiver disposed at a subscriber station and a secure data processor, for generating a watermark, the watermark generated at least in part according to a secure data processor-unique identifier, processing the received data to reproduce the media program, and inserting portions of the generated watermark in the reproduced media program at locations determined at least in part according to the secure data processor-unique identifier to produce a watermarked media program provided for display.

The Transport Chip or System on Chip (SOC) watermark system disclosed herein will always meter out chip-unique programmed data, at a set or reasonably deterministic interval, thus eliminating the need for a Headend or STB kernel Client, and their associated fees, to control the process. Previously, the headend would communicate with software resident on the STB with information on watermark placement. In this embodiment, the secure processor will always generate this data and embed the watermark within the frame, without any client software or headend control. Once enabled, the watermark feature of the secure processor cannot be disabled. Insertion of the mark can occur somewhat deterministically while still allowing the mark to move around throughout the picture in a unique pattern for each STB thereby greatly simplifying both the headend and STB impact on software and hardware requirements as well as the overall deployment overhead.

The foregoing provides a simple way to enable watermarking functionality as a standard function of the Transport chipset technology. This simple design does not impose requirements on the broadcaster, and is therefore apt to will receive complete support from the studios that may likely mandate its implementation.

BRIEF DESCRIPTION OF THE DRAWINGS

Referring now to the drawings in which like reference numbers represent corresponding parts throughout:

FIGS. 7A-7C are diagrams showing a particular example of the generation of a watermark and its insertion into multiple frames of the media program;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
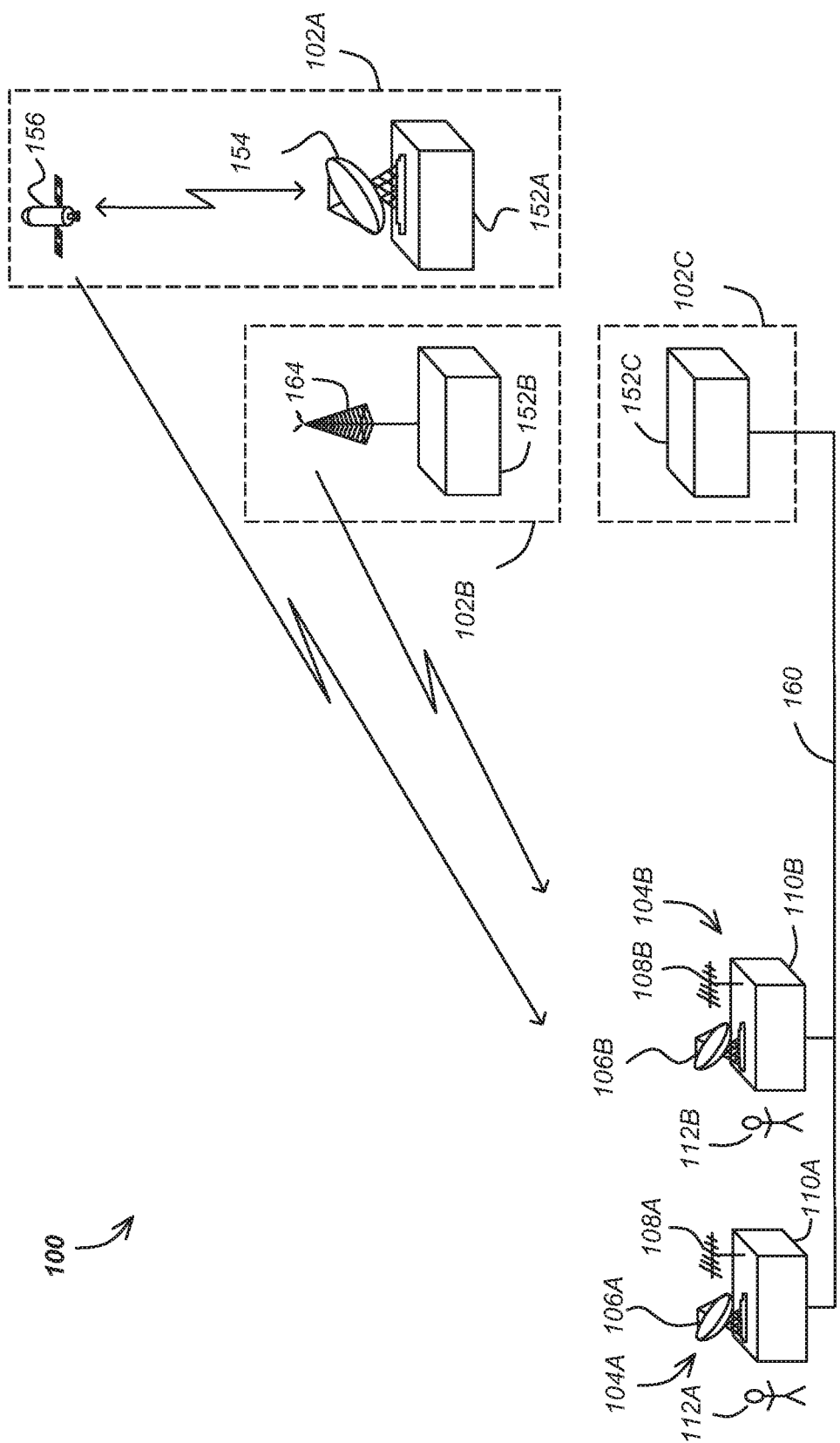
FIG. 1 is a diagram illustrating an exemplary media program distribution system.

FIG. 1 is a diagram illustrating an exemplary media program distribution system 100. The system 100 may include one or more service providers or headends (hereinafter alternatively referred to as broadcasters) 102, such as a first service provider 102A that broadcasts media programs from a satellite broadcast facility 152A via one or more uplink antennas 154 and one or more satellites 156, a second service provider 102B, that broadcasts media programs from terrestrial broadcast facility 152B and one or more terrestrial antennas 164, and a third service provider 102C that broadcasts or transmits media programs by use of a cable broadcast facility 152C via a cable link 160 or via the Internet. The transmission of the media programs may be over substantial distances in the order of miles, or shorter distances (for example, within a motel, airplane, or ocean going vessel).

The system 100 also comprises a plurality of subscriber stations 104A, 104B (alternatively referred to hereinafter as subscriber station(s) or receiving station(s) 104), each providing service to one or more subscribers 112A and 112B (alternatively referred to hereinafter as subscribers 112). Each subscriber station 104A, 104B may include a satellite reception antenna 106A, 106B (alternatively referred to hereinafter as satellite reception antenna 106) and/or a terrestrial broadcast antenna 108A, 108B (alternatively referred to hereinafter as terrestrial broadcast antenna 108) communicatively coupled to an STB or receiver 110A, 110B (alternatively referred to hereinafter as receiver(s) 110, STBs, or integrated receiver/decoder(s) (IRDs)).

Figure 2:
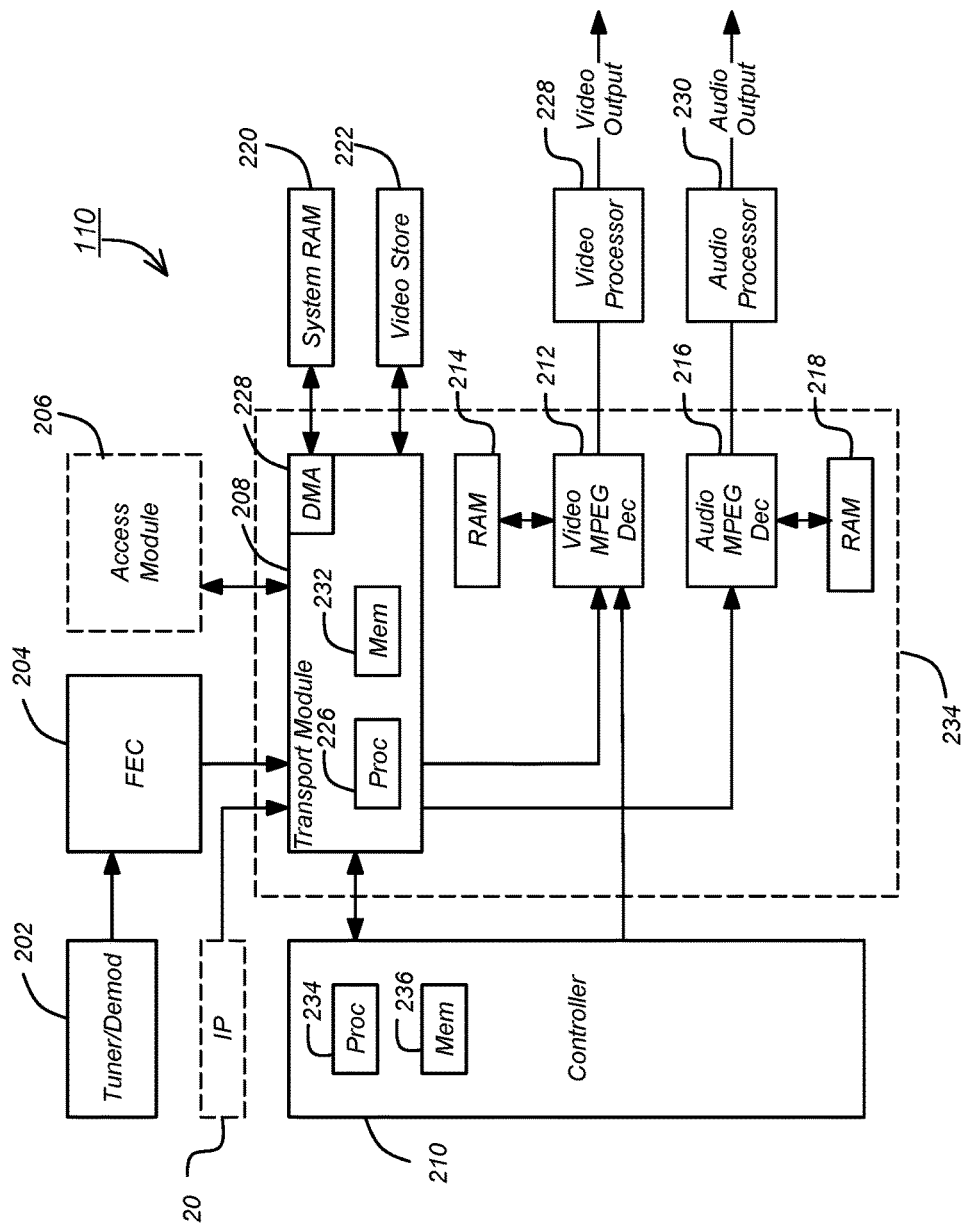
FIG. 2 is a diagram illustrating an exemplary embodiment of a receiver.

FIG. 2 is a diagram illustrating an exemplary embodiment of a receiver 110. The receiver 110 may comprise a tuner/demodulator 202 communicatively coupled to the antennas 108/106. The tuner/demodulator 202 converts the modulated data to a digital data stream. The digital data stream may be supplied to a forward error correction (FEC) decoder 204. This allows the receiver 110 to correct data errors in signals transmitted using forward error correction. The error-corrected data is then fed from the FEC decoder module 204 to the transport module 208.

The transport module 208 performs many of the data processing functions performed by the receiver 110. The transport module 208 processes data received from the FEC decoder module 204 and provides the processed data to the video decoder 212 and the audio decoder 216. The transport module 208 also provides a passage for communications between the main processor 210 and the video and audio decoders 212, 216. The transport module 208 also operates with the access module 206 to determine whether the subscriber 112 is permitted to access certain program material. The operations performed by the transport module 208 may be controlled by the controller 210 and are further illustrated and described below.

Typically, one or more media programs are transmitted to the receiver 110 in a time division multiple access (TDMA) packet-based transport stream that transports one or more media programs. Packets belonging to one particular media program are distinguished from other packets via an identifier such as a program identifier (PID) as described in the MPEG protocol or a channel identifier (CID). In receiving a particular program the transport module 208 assembles the packets having a particular PID or CID associated with the selected media program or channel, and provides those assembled packets to the video decoder 212 and the audio decoder 216 to produce the video output and the audio output.

In one embodiment, the packets representing the media program are encrypted according to a secret or key (K), and an access card 206 removably coupleable to the receiver 110 is used to decrypt the packets so that the media program may be presented. In one embodiment, the transport stream includes key packets that are transmitted to the receiver 110. The transport module 208 separates these key packets according to the appropriate packet identifier, and sends them to the access module 206. The access module 206 decrypts the key packets to produce the keys needed to decrypt the associated media program packets and provides those decryption keys to a descrambler in the transport module 208. These decrypted packets (which include video and audio data embodying the decrypted media program) are provided to the video decoder 212 and audio decoder 216.

Video data is processed by the video decoder 212. Using the video random access memory (RAM) 214, the video decoder 212 decodes the compressed video data and sends it to an encoder or video processor 228, which converts the digital video information received from the video decoder 212 into an output signal usable by a display or other output device. By way of example, processor 228 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if ATSC high definition programming is processed.

Audio data is likewise decoded by the audio decoder 216. The decoded audio data may then be sent to a digital to analog (D/A) converter 230. If desired, additional channels can be added for use in surround sound processing or secondary audio programs (SAPs). In one embodiment of the invention, the dual D/A converter 230 itself separates the left and right channel information, as well as any additional channel information. Other audio formats may similarly be supported. For example multi-channel digital audio formats, such as DOLBY DIGITAL AC-3.

The video processing module 228 output can be directly supplied as a video output to a viewing device such as a video or computer monitor. In addition the video and/or audio outputs can be supplied to an RF modulator to produce an RF output and/or 8 vestigal side band (VSB) suitable as an input signal to a conventional television tuner. This allows the receiver 110 to operate with televisions without a video output.

In one embodiment, the decrypted packets transmitted from the transport module 208 to the video decoder 212 and/or audio decoder 216 are transmitted via transport module using direct memory access (DMA) 224 to the system RAM 220. In other words, the transport module 208 writes decrypted media program packets to the system RAM 220 via DMA 224, and reads those packets from the system RAM 220 via DMA 224 to provide them to the appropriate video 212 or audio 216 decoder. The transport module 208 may also include one or more secure internal memory modules that can be used to buffer media program packets, to store decryption information and/or instructions for performing the foregoing operations.

A description of the processes performed in the encoding and decoding of video streams, particularly with respect to MPEG and JPEG encoding/decoding, can be found in Chapter 8 of "Digital Television Fundamentals, by Michael Robin and Michel Poulin, McGraw-Hill, 1998, which is hereby incorporated by reference herein.

Controller 210 receives and processes command signals from the user (e.g. from selecting controls on the receiver 110 or an associated remote control. The main processor 210 receives commands for performing its operations from a processor programming memory, which permanently stores such instructions for performing such commands. The processor programming memory may comprise a read only memory (ROM), an electrically erasable programmable read only memory (EEPROM) or, similar memory device. The main processor 210 also controls the other digital devices of the receiver 110.

The receiver 110 may also comprise a local storage unit such as the video storage device 222 for storing video and/or audio data obtained from the transport module 208. Video storage device 222 can be a hard disk drive, a read/writable compact disc of DVD, a solid state RAM, or any other storage medium. In one embodiment of the present invention, the video storage device 222 is a hard disk drive with specialized parallel read/write capability so that data may be read from the video storage device 222 and written to the device 222 at the same time. To accomplish this feat, additional buffer memory accessible by the video storage 222 or its controller may be used. Optionally, a video storage processor can be used to manage the storage and retrieval of the video data from the video storage device 222. The video storage processor may also comprise memory for buffering data passing into and out of the video storage device.

The functions implemented by the above-described modules may be implemented by a processor and memory resident in the module itself, or performed using a processor and/or memory of a communicatively coupled module. For example, in one embodiment, the transport module 208 itself comprises a processor 226 and a memory 232 for performing the above described operations, including the identification of packets according to their identifiers and the decryption and distribution of data. Alternatively, some or all of those functions can be implemented using the controller 210 processor executing instructions stored in memory 236. Similarly, the video and audio decoders 212, 216 may include internal processors and memories for performing the functions described above.

The transport module 208, video decoder 212 and audio decoder 216 may all be implemented on one or more integrated circuits. This design promotes both space and power efficiency, and increases the security of the functions performed within the transport module 208. Further, the transport module 208 alone or the transport module 208 video decoder 212 and audio decoder 216 and their associated memories 214, 218 may be implemented on a single system on a chip (SOC) hereinafter referred to as a transport chip. This implementation inherently increases the security of the receiver 110, and can be used to implement the watermarking functionality described further below.

Overview

Utilizing some of the secret and public data being programmed into a SOC chipset, readily identifiable data that cannot be controlled or manipulated by outside software is made available for purposes of inserting a watermark on reproduced media programs. The watermark data may be later recovered and compared to databases relating watermarks to receivers 110 to forensically identify the receiver 110 that reproduced the media program.

As described herein, the watermark generated from a receiver or secure processor unique identifier and is deterministically inserted piecemeal into a plurality of media program frames, with each portion of the watermark inserted into different portions of subsequent media program frames according to a receiver 110 or secure data processor unique identifier. The transport chip includes a built in function inside the video processing path that automatically places chip unique data into the outgoing video stream. Incorporating this process into the video processing process completely within the transport chip helps to assure the process is not compromised or circumvented.

The watermark portions may be inserted in every frame, or on a periodic basis. For example, a few bits of the watermark data could be placed in every $N^{th}$ frame or given number of milliseconds (i.e. 750 ms) of the media program. This insertion rate would be below the level of detection threshold by the viewer, but still allow retrieval of the data for forensic applications. An algorithm that deterministically computes where the portions of the watermark are inserted within the media program (e.g. which portions of the frames in which order and/or which frames in which order) can differ for different secure data processor 234 chip to chip, or vendor to vendor.

For example, one such low-overhead watermark placement algorithm is to divide the screen into 16 locations and cycle through each 4-bits of the receiver identifier to select one of these quadrants in which to place the watermark. Each new group of the 4-bits of the receiver identifier would define where the watermark is placed on the next interval. The algorithm for thus placing the watermark is straightforward, requiring almost no processing overhead in the receiver, is independent the video itself, and requires no processing by the headend. Occasionally the watermark may not be recoverable on post analysis but since it is always on the mark could be viewed at the next interval. Using this simple algorithm, portions of the watermark would jump around the screen as a function of the receiver identifier.

Other data could be included to help the forensic efforts, but care needs to be taken as to not create too complex a system as to increase chip overhead or potentially affect the quality of the video adversely.

The watermark-inserting functionality of the transport chip may be activated via a fuse in the transport chip via a suitable command. Once activated, the watermark function is always on and watermark data is thereafter always incorporated the data into the video stream. The command activating the fuse may includes the manufacturer of the receiver 110 or transport chip, the broadcaster 102, or a third party conditional access or digital rights management (DRM) vendor independent from the broadcaster 102 or the receiver 110 or transport chip vendors. In some instances, the fuse can be set via an over the air command, thus enabling turning the function on in the field after the receiver has been purchased and deployed to the subscriber station 104. Since it is a fuse setting, there is no possibility of a hacker or unauthorized third party from turning this feature off once it is turned on.

Because the watermarking functionality is protected in software by a signed code region or a hardware-implemented function irreversibly incorporated into the transport chip video processing path, it is difficult or impossible to bypass by common techniques such as inserting software modules in unsigned code regions.

The watermarking technique described below does not require a software client at the headend 102. Instead, the watermark insertion is performed by the receiver 110 using a secure data processor 234 executing software instructions that are protected from modification by boot protection that used an RSA signature protect a code region to ensure that the code cannot be modified in the field. Once enabled by the security fuse, the watermark insertion routine cannot be turned off by the receiver 110. This reduces the complexity and cost needed to incorporate watermarking into the media program distribution system 100. It also eliminates a significant attack point for the pirates who may attempt to subvert or interfere with the watermarking process. For example, for some prior art systems, the watermark must be in a very specific area of the picture frame (like Video Blanking Interval Line 24) and nowhere else in the frame, or has to be in a blank frame that gets inserted into the video stream at the headend without disrupting the user experience. These restrictions do not apply with the system described herein, because the placement of the watermark is (deterministically) changed from frame to frame to stop someone from making a software tool that only searches in one spot to try to automatically remove the watermark. The watermark (or portions of it) can be placed anywhere in the uncompressed video frame.

Sample Embodiments

Figure 3:
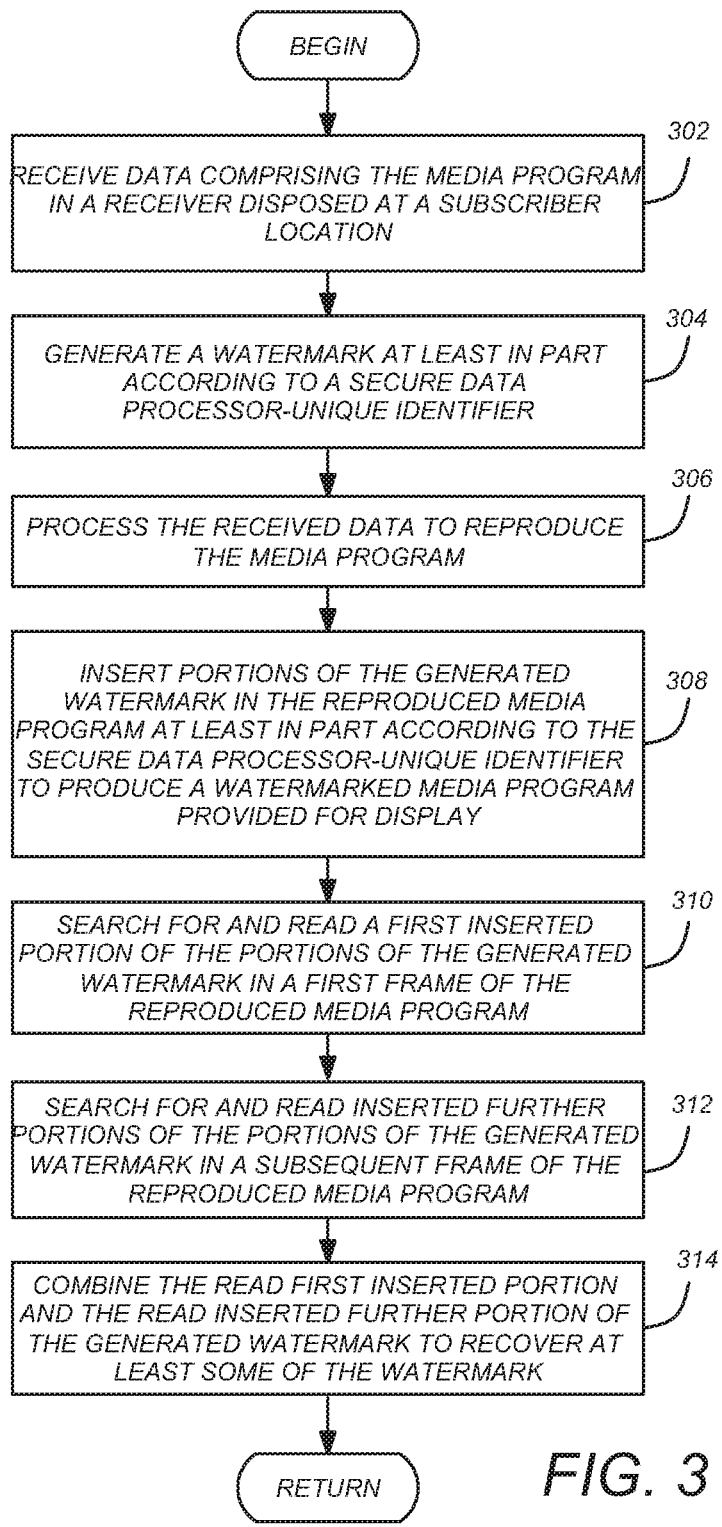
FIG. 3 is a diagram presenting an exemplary for inserting and recovering the watermark.

FIG. 3 is a diagram presenting an exemplary for inserting and recovering the watermark. In block 302, data comprising a media program is received from a headend 102 in a receiver 110 at a subscriber station 104. In one embodiment, the data is transmitted by satellite, terrestrial broadcast, or cable transmission, in which case, the transmission is received by the tuner/demodulator 202 of the receiver, error corrected by the error correcting module 204 and provided to a transport module 208 disposed in a secure data processor 234. In another embodiment, the media program is received via the Internet according to an Internet protocol (IP) paradigm.

In block 304, a watermark is generated. In one embodiment, the watermark is generated at least in part according to unique identifier of a secure data processor 234 (PID) of the receiver 110.

Figure 4:
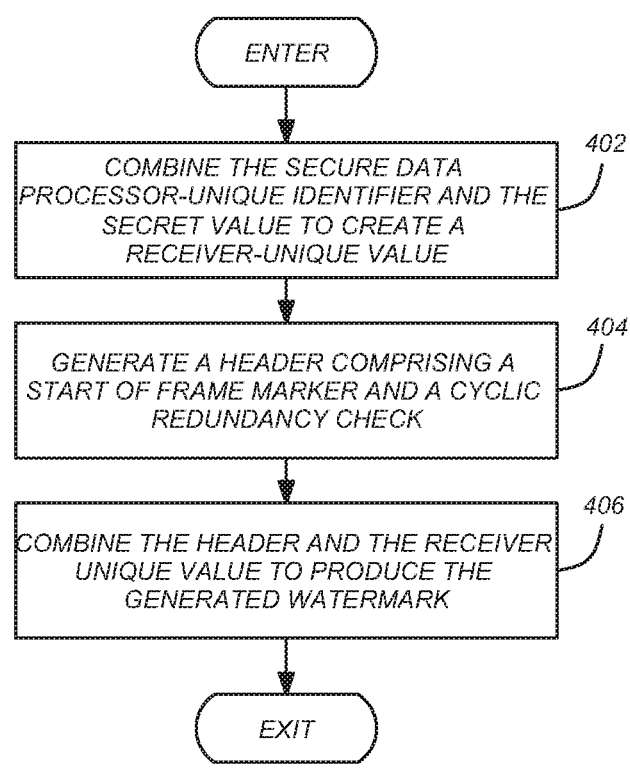
FIGS. 4 and 5 are a diagram illustrating one embodiment of how the watermark may be generated
Figure 5:
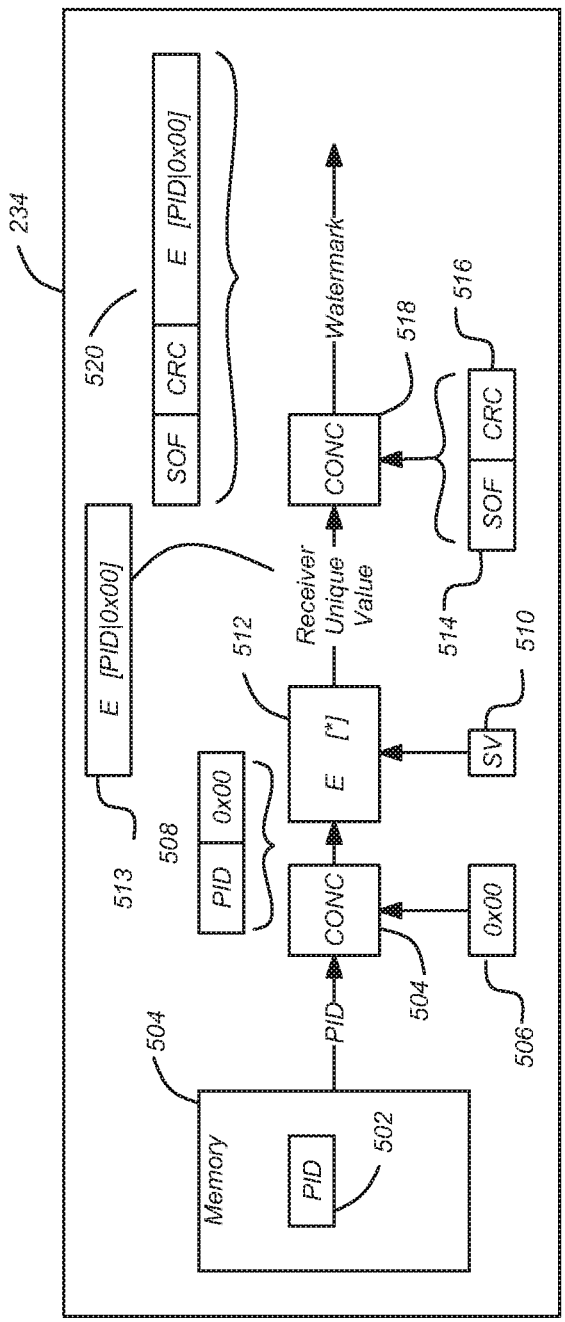

FIGS. 4 and 5 are a diagram illustrating one embodiment of how the watermark may be generated. In block 402 of FIG. 4, the PID 502 is used to create a value that is unique to the receiver 110. In one embodiment, the PID 502 is combined with a secret value (SV) to create a receiver unique value 513. This combination can be a simple concatenation of the PID and the SV, an exclusive OR operation applied to the PID and the SV, or the PID may be encrypted with the SV, for example, using encryptor 512, or any combination of the foregoing.

FIG. 5 presents a diagram illustrating an embodiment in which the PID 502 retrieved from a secure memory 236 in the secure data processor 234. The PID 502 is concatenated with another value (in the illustrated embodiment (0x00) of block 506 by a concatenation process 504 implemented by the secure processor 234 to generate value 508. This value 508 then encrypted with a secret value SV 510 to generate a receiver-unique value 513.

Returning to FIG. 4, in block 404, a header is generated comprising a start of frame marker (SOF) 514 and a cyclic redundancy check (CRC) 516. The SOF 514 marker identifies the point in a frame where the first portion of the watermark will be inserted, as discussed further below.

The CRC 516 is an error-detecting code that detects changes to the watermark and is later used to determine if the entire watermark has been regenerated or recovered. The CRC 516 is computed based on the watermark data (for example using polynomial division, XORing or a summing), and added to the watermark (for example, by creating a header of the SOF 514 concatenated with the CRC 516). Upon retrieval of the portions of the watermark inserted into different portions of succeeding frames, the computation of the CRC based on the currently retrieved or recovered watermark portions and compared to the CRC 516 in the header. If the computed CRC and the CRC 516 read from the header do not match, the system searches for further watermark portions and/or reject some data originally thought to be part of the watermark.

Next, as shown in block 406, the header and the receiver unique value 513 are combined to produce the generated watermark 520. This may be accomplished via the concatenation operation 518 shown in FIG. 5.

The beginning of the watermark 520 can be identified by the SOF 514. Since a deterministic byte stuffing technique is used as is commonly done in data communication protocols, the actual length of the watermark 520 may be variable. Optionally the SOF 514 can be followed by an explicit length parameter to provide a fixed length for the embedded watermark 520 that includes the header.

Returning to FIG. 3, the received data is processed to reproduce the media program, as shown in block 306. Typically, the received data is transmitted in a packetized transport stream having a plurality of media programs, with each packet associated with a channel or program identifier. The transport module identifies the packets associated with the desired media program or channel and provides those packets to the video decoder 212 and audio decoder 216 for further processing to recover the video and audio information for display. Typically, the media program is represented by a plurality of frames that are sequentially produced to the viewer. In the MPEG standard, these frames include I-frames, B-frames, and P-frames. I-frames are intra-coded key or anchor frames that include all of the information necessary to decode and decompress the information in the frame. I-frames are analogous to a conventional static image. P-frames are predictive frames that represent the changes in the image when compared to the previous frame. B-frames are bi-predictive, meaning that they use differences between the current frame and the following frame to specify content. MPEG decoders take the information in the I, P, and B frames and combine them to create a series of video frames that reproduce the media program when presented sequentially. Before providing those video frames for further processing by the video processor 228 (if necessary), the video decoder places those frames in a frame memory or buffer 214. Similarly, the audio decoder 216 may place data in a buffer or memory 218.

Next, portions of the generated watermark are inserted in the media program as shown in block 308. In one embodiment, this is performed so that the frame and the portion of the frame that the watermark or portion of a watermark is inserted is deterministic in a way that identifies the receiver 110 that has inserted the watermark. In a preferred embodiment, the portions of the watermark are inserted at least in part according to a combination of the PID 502 and SV 510. For example, a first portion of the watermark may be inserted in to a first portion of a first frame of the media program and a further portion of the watermark may be inserted into a temporally subsequent frame at a location within that second frame as determined by the PID 502/SV 510 combination. The temporally subsequent frame may be the frame that immediately follows the first frame (so that there are no frames without a portion of the watermark), or the next watermark portion may be inserted into a temporally subsequent frame that is N frames later. Further, other embodiments are possible in which the location of each of the watermark portions is determined by the PID 502 instead of a combination of the PID 502 and the SV 510.

The PID 502 or PID 502/SV 510 can be used to deterministically and uniquely place portions of the watermark in other ways as well. For example, the PID 502 and/or SV 510 may determine which subsequent frame the second portion of the watermark is inserted, but not the location within that subsequent frame. Or, the PID 502 and/or SV 510 may determine both the subsequent frame into which the second watermark portion is inserted and the location within that subsequent frame (e.g. which frame portion the second watermark portion is inserted into). The PID 502 and/or SV 510 can also be used to determine how large a portion of the watermark is inserted into each frame. For example, the number of bytes inserted into each subsequent frame may be determined according to the PID 502 and/or SV 510.

Figure 6:
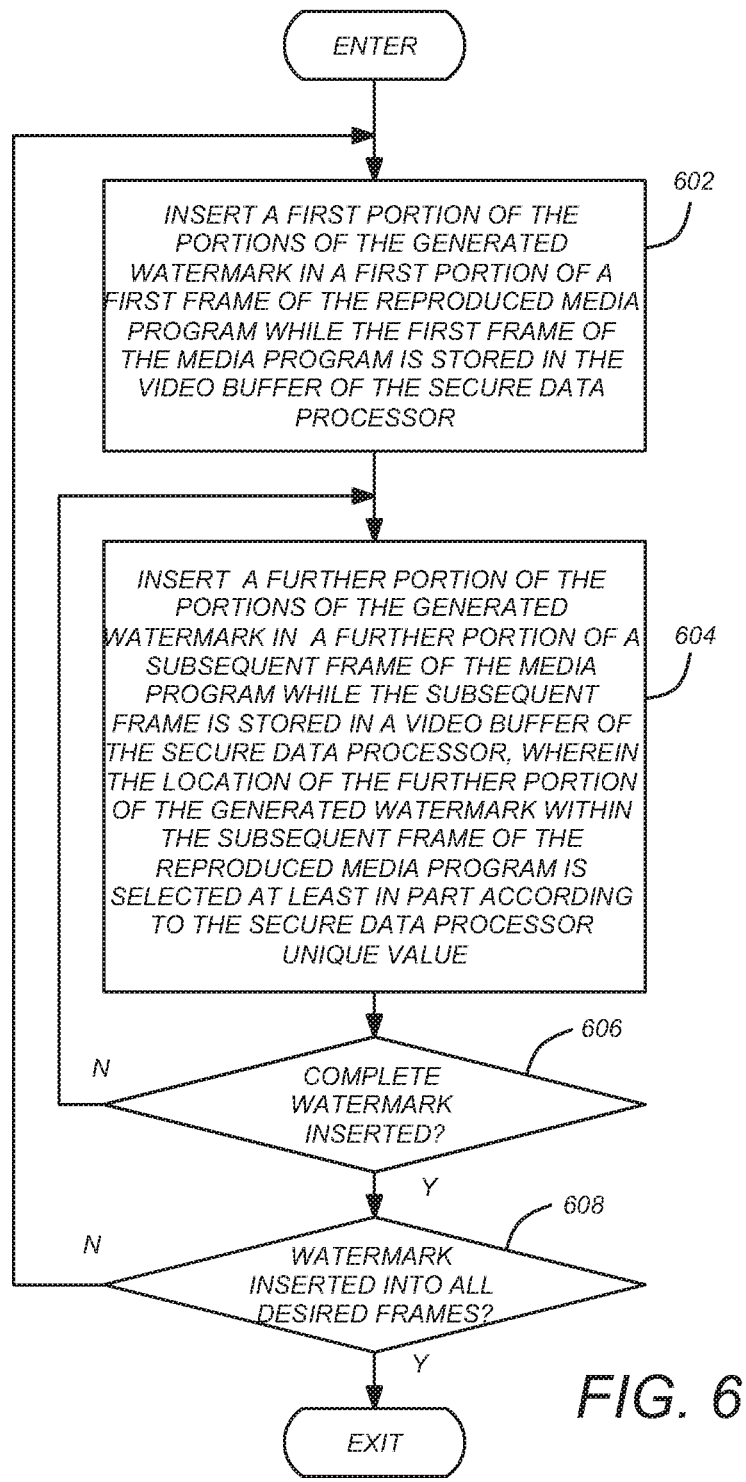
FIG. 6 is a diagram illustrating exemplary method steps that can be used to insert the watermark into the frame(s)

FIG. 6 is a diagram illustrating exemplary method steps that can be used to insert the watermark into the frame(s). In this embodiment, the watermark is divided into a plurality of portions, and each of these watermark portions are inserted into a portion of the frames as determined by the PID 502/SV 510. Turning first to block 602, a first portion of the portions of the watermark are inserted into a first frame of the reproduce media program.

In block 604, a further portion of the portions of the generated watermark are inserted into a further portion of a subsequent frame of the media program while that subsequent frame is stored in a video buffer of the secure data processor 234. The location that the further portion of the generated watermark is stored is selected at least in part according to in the secure data processor 234 unique value (e.g. the PID or PID/SV combination). In block 606 a determination is made regarding whether the complete generated watermark has been inserted into the media program. If not, processing returns to block 604 where a still further portion of the portions of the generated watermark is inserted in a further subsequent frame of the media program, again at a location (a further subsequent frame portion) determined at least in part according to the secure data processor 234 unique value.

Figure 7B:
Figure 7C:

FIGS. 7A-7C are diagrams showing a particular example of the generation of a watermark and its insertion into multiple frames of the media program. In this example, we assume transport chip 234 has:

Secure data processor identifier (PID)= E56BFD29036FD4D0 (ASCII HEX); and Secret value (SV) of 790297C19B937E348F3754EE471262BE (ASCII HEX)

Using the operations described above with respect to FIGS. 4 and 5, the watermark may be generated by concatenating the PID 8 zeros to form a 16 byte block:
E56BFD29036FD4D00000000000000000 (plaintextBuffer)

That concatenated PID may be processed (e.g. decrypted via the advanced encryption standard, AES) using the secret value (SV), resulting in:
AES-D(SV, plaintextBuffer)=2190202BF3F34DA-BBAEC6CE032E1D0CE (ciphertextBuffer)

Next, a CRC can be computed over the result of the above AES operation:
CRC16(ciphertextBuffer)=1919

And the watermark can be created by concatenating a SOF value with the CRC, wherein the SOF value=2 byte start of frame (7E+length). This results in the following watermark:
7E1319192190202BF3F34DABBAEC6CE032E1D0CE Portions (or "nibbles") of the watermark can then be placed in the appropriate section of a series of media program frames, based on each portion of the watermark that is inserted.

FIG. 7A is a diagram of a first frame 702A of the reproduced media program. The first frame 702A comprises a plurality of frame portions 704A-704P, each associated with an ASCII value 0-F. In the example, the first portion of the watermark is the character "7" and so the first "nibble" of the watermark data is stored in the portion of the media program frame associated with the character "7." The data that is actually inserted into portion 704H may be binary data equal to the value of the portion of the watermark (e.g. 0111), may be a character or symbol (e.g. ♦ or *), which may or may not be mapped to the watermark value (e.g. ♦=7). This is preferably accomplished while the media program frame 704A is stored in the uncompressed video buffer of the secure data processor 234. Inserting the most significant portion of the watermark (which constitute the header, which has the SOF 514 and CRC 516) permit the beginning of the watermark to be more easily found in subsequent processing, as further described below.

The watermark data can inserted into the frame portion using a variety of techniques. For example, if the frame data is coded according to the additive red-green-blue (RGB) color model, watermark portion may be substituted for the least significant bits of one or more of the colors, causing the hue of that portion of the frame to differ slightly from the original value. In embodiments using a color lookup table (CLUT) defining the palette of colors, the indexed color can be altered. In other color models, the watermark may be substituted for the least significant bits of luminance, chrominance, hue, or intensity data of the portion of the media program frame. The watermark portion may be blended into the color scheme of the background image by using a constant color and an XOR operation with the underlying bits. In one embodiment, each watermark portion occupies no more than approximately 2% of each of the media program frame portions 704 shown in FIGS. 7A-7C.

FIG. 7B is a diagram of a subsequent frame 702B of the reproduced media program. In the example, the next portion of the watermark is the character "E", so the second portion of the watermark would be placed in the portion of the subsequent media program frame 702B that is associated with the character "E", or portion 7040. Again, the data that is actually inserted may be binary data equal to the value of the portion of the watermark (1110) or may be a character or symbol.

As shown in block 606 of FIG. 6, these operations continue until the complete watermark (in this case, 40 portions, designated as A-AN) has been inserted into subsequent frames of the media program. The result is that the watermark portions are inserted into the initial frame and subsequent frames as shown in FIG. 7C in frames 702A-702AN. After this has been accomplished, block 608 routes processing back to block 602 so the watermark is again inserted into the media program frames as described in blocks 602 and 604. In the foregoing example, 4 bits of a 20 byte watermark is placed into the decompressed media program frames, while those frames reside in the video buffer 214. The entire watermark can be placed in 40 successive 4 bit placements. If desired, watermark portion placement can be attempted in only even or odd frames, and these frames may be consecutive or spaced apart by frames without watermark data.

In the foregoing example, the mapping of watermark 520 portions to frame portions 704 remained constant during the insertion of the watermark 520 portions in the media program frames 702. In other embodiments, this mapping is changed so that the start of frame marker for the next inserted watermark does not necessarily fall in the same portion of the media program frame. For example, after the first watermark is completely inserted into the media program frame 702, the zero (0000) frame portion 704A may be moved to the location formerly occupied by the three (0011) frame portion 704D. Other frame portions may then be mapped based upon the new position of the zero (0000) frame portion. For example, frame portions zero, one, and two may be placed in locations 704H, 704I and 704J, with the remainder of the frame portions following the same pattern. The choice of where the zero frame is rotated can be deterministic and also based on the PID 502 or a combination of the PID 502 and the SV 510. In one embodiment, the location to which the of the following zero frame may be a function of the last byte in the watermark. For example, in the illustrated example, the last two byte in the watermark was the characters "C" and "E" and this information can be used to define the rotation of the zero portion by an amount equal to the sum or other combination of "C" and "E." Other paradigms in which the rotation of the zero frame is random are also possible.

It is important to note that the watermark insertion paradigm illustrated in FIGS. 7A-7C does not impose any watermark timing considerations in the video processing performed by the receiver 110. In other words, if the video processing does not allow enough time to insert the next succeeding watermark portion in the designated portion 704 of the desired media program frame, that operation may be delayed to the same designated portion 704 of the following media program frame or even the frame after, because it is the pattern by which the data is inserted that allows recovery of the watermark.

The foregoing operations are performed using instructions permanently and unchangeably coded into the secure data processor 234 by its manufacturer. These instructions may be integrated with other routines performed by the secure data processor 234 and are typically stored in a code region protected by an RSA signature to prevent modification by an attacker.

Returning to FIG. 3, once inserted into the media program, the watermark provides the ability to forensically identify the receiver 110 that reproduced the media program. This can be accomplished by searching for and reading the first inserted portion of the watermark of in the first frame of the reproduced media program, as shown in block 310. Next, block 312 searches for and reads the inserted further portions of the watermark in a subsequent frame 702B of the media program at a location within the subsequent frame 702B. Then, the watermark is regenerated by combining the read first inserted portion and the read further portion(s) of the watermark, as shown in block 314. The PID of the secure data processor 234 can then be compared to the recovered watermark and used to identify the receiver 110 that reproduced the media program as further described below.

Figure 8:
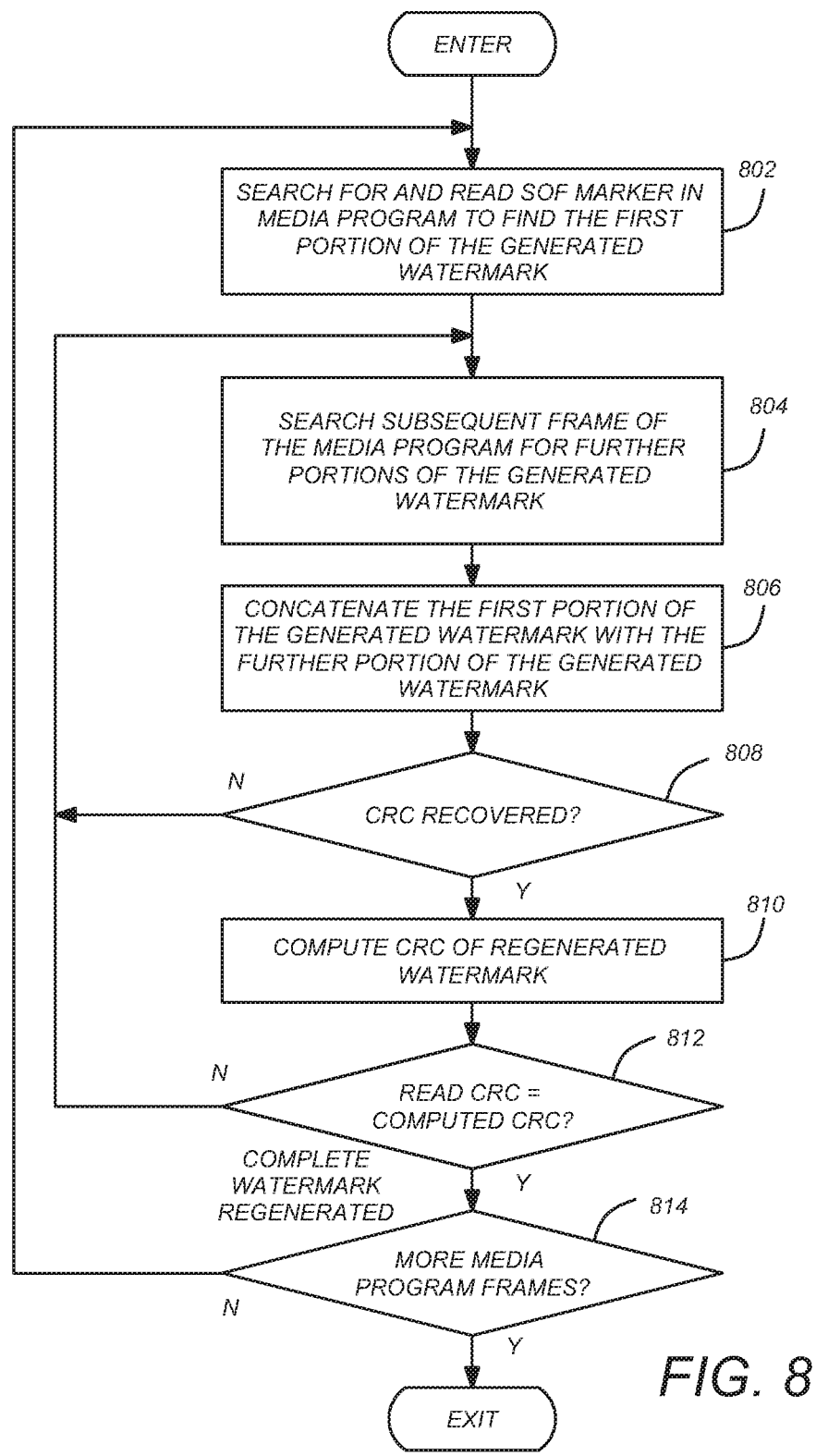
FIG. 8 is a diagram illustrating exemplary method steps that can be used to recover the watermark.

FIG. 8 is a diagram illustrating exemplary method steps that can be used to recover the watermark. In block 802, a first frame 702A of the media program is searched to find the SOF marker 514. This can be accomplished with algorithms that perform analysis of the frames of the media program (which may be isolated via a screen capture function) to identify frame portions that have been modified from their original state. For example, edge detection algorithms can be employed to determine candidate frame portions 704 where watermark data may have been inserted. Returning to the example shown in FIGS. 7A-7C, the SOF marker "7" is stored in portion 704H of media frame 702A.

As shown in block 806, a subsequent frame 702B of the media program (which may be temporally adjacent subsequent frame or a frame N frames distant) is searched to find a further portion of the watermark, again by performing an analysis of the image, for example, using edge detection algorithms. In block 806, the read first portion of the watermark and read further portion of the watermark are concatenated to begin reconstruction of the watermark. This continues until the CRC has been recovered, as shown in block 808. Returning to the example shown in FIGS. 7A-7C, the CRC of 1919 is stored in intervals 5-8, or in media frame portion 704B of the 5th media program frame 702E, frame portion 704J of the 6th media program frame 702F, in media frame portion 704B of the 7th media program frame 702F, and in media frame portion 704J of the 8th media program frame 702G. Therefore, block 808 directs processing to block 804 until the entire CRC has been recovered.

In block 810, a CRC is computed for the currently reconstructed watermark, and block 812 compares the CRC of the currently reconstructed watermark with the CRC recovered after block 808. If the two CRCs match, the complete and accurate watermark has been regenerated, and processing is passed to block 814. If the read CRC does not match the computed CRC, this indicates that not all portions of the watermark have been recovered, and processing returns to block 806. In the illustrated example, there is no computed CRC for the watermark (as only the SOF and the CRC fields have been recovered), so block 812 passes processing to block 804 and a subsequent frame is again searched for further portions of the watermark. In the illustrated example, the first byte of the watermark to follow the SOF and the CRC is "2," which is stored in media frame 702H at media frame portion 704C. Block 806 concatenates this data with the portions already recovered, and passes processing to block 808. Since the CRC has already been recovered, block 808 passes processing to block 810, where the value "2" is used to compute the CRC of the recovered watermark. Since this single value will not result in a computed CRC that matches the recovered value of (1919), block 812 reroutes processing to block 804 where same operations are performed. This process continues until block 812 determines that the read CRC and the computed CRC match, at which time, the complete watermark has been recovered.

Once the entire watermark has been recovered, processing is passed to block 814, which returns processing to block 802 to begin the watermark recovery process anew for additional subsequent media program frames, and ends processing if there are no further media program frames to analyze. Confidence in reconstructing the correct watermark is achieved by computing the CRC16 function over the recovered watermark. However, the process may continue, with further watermarks being recovered. Since all of the watermarks should be from the same receiver having the same secure processor ID (and also the same receiver ID), errors in the watermark recovery can be reduced by post processing the retrieved watermarks to eliminate spurious results. For example, if 95% of the recovered watermarks are identical, it can be reasonably assumed that the remaining 5% of the watermarks were recovered in error.

In the foregoing embodiment, the watermark information is held at least in part by the location of the portion of the media program frame in which the inserted symbols or data are found. However, the data stored in those portions of the media program frames can also be used as the watermark or to assist in the recovery of the watermark. For example, each receiver 110 may be configured with an at least partially unique mapping between the watermark portions and the symbols that are written in the media frame portions (for example, a particular receiver may be configured to write a particular symbol (e.g. ♦ when the watermark portion is a "7"). In this embodiment each position could be mapped to a unique symbol and that information can be used in the recovery process to eliminate errors in recovering the watermark or in confirming the recovery of the watermark.

Hardware Environment

Figure 9:
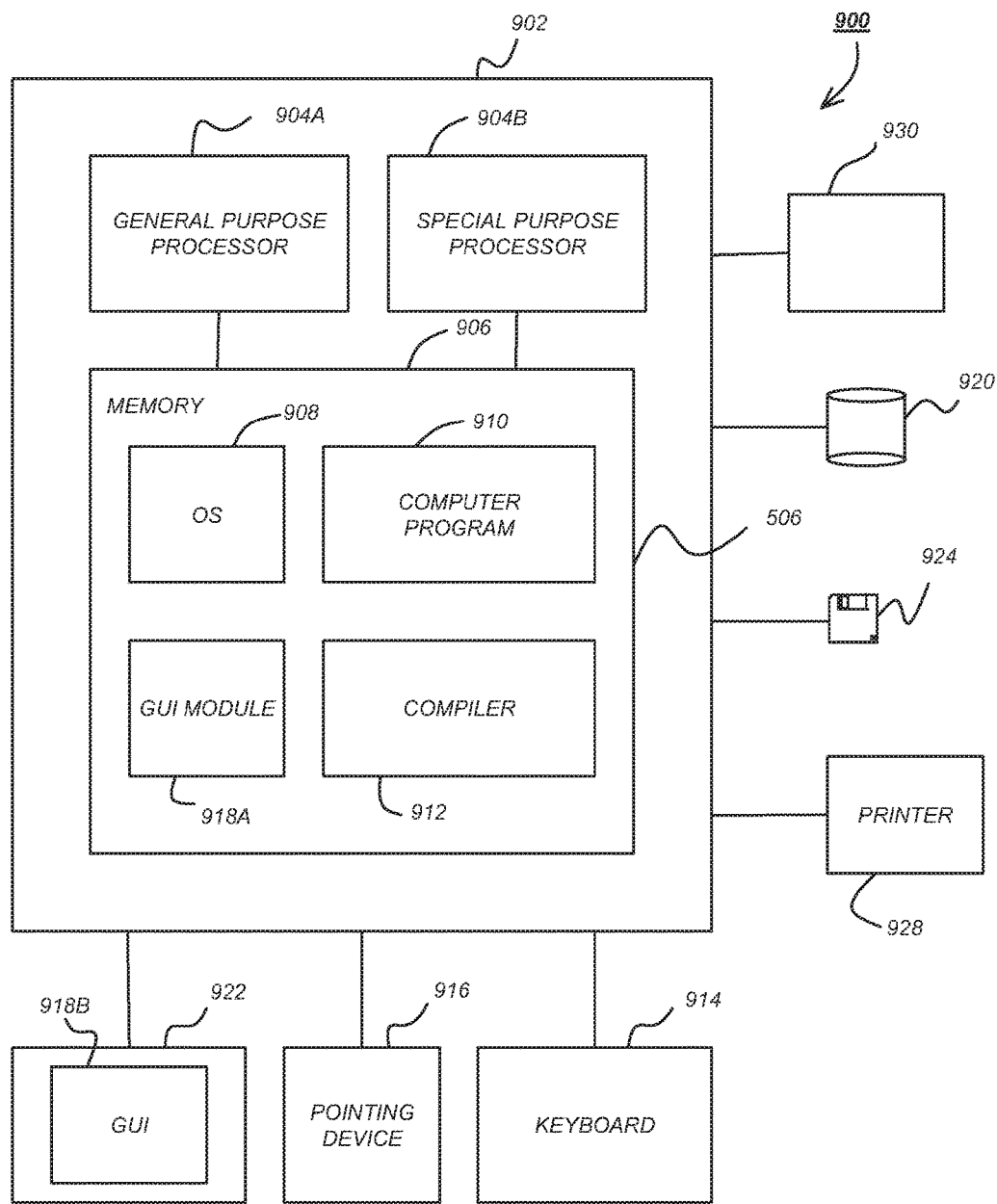
FIG. 9 is a diagram illustrating an exemplary computer system 900 that could be used to implement elements of the present invention, including the operations shown in FIG. 8.

FIG. 9 is a diagram illustrating an exemplary computer system 900 that could be used to implement elements of the present invention, including the operations shown in FIG. 8. The computer 902 comprises a general purpose hardware processor 904A and/or a special purpose hardware processor 904B (hereinafter alternatively collectively referred to as processor 904) and a memory 906, such as random access memory (RAM). The computer 902 may be coupled to other devices, including input/output (I/O) devices such as a keyboard 914, a mouse device 916 and a printer 928.

In one embodiment, the computer 902 operates by the general purpose processor 904A performing instructions defined by the computer program 910 under control of an operating system 908. The computer program 910 and/or the operating system 908 may be stored in the memory 906 and may interface with the user and/or other devices to accept input and commands and, based on such input and commands and the instructions defined by the computer program 910 and operating system 908 to provide output and results.

Output/results may be presented on the display 922 or provided to another device for presentation or further processing or action. In one embodiment, the display 922 comprises a liquid crystal display (LCD) having a plurality of separately addressable pixels formed by liquid crystals. Each pixel of the display 922 changes to an opaque or translucent state to form a part of the image on the display in response to the data or information generated by the processor 904 from the application of the instructions of the computer program 910 and/or operating system 908 to the input and commands. Other display 922 types also include picture elements that change state in order to create the image presented on the display 922. The image may be provided through a graphical user interface (GUI) module 918A. Although the GUI module 918A is depicted as a separate module, the instructions performing the GUI 918B functions can be resident or distributed in the operating system 908, the computer program 910, or implemented with special purpose memory and processors.

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 902 may also implement a compiler 912 which allows an application program 910 written in a programming language such as COBOL, C++, FORTRAN, or other language to be translated into processor 904 readable code. After completion, the application or computer program 910 accesses and manipulates data accepted from I/O devices and stored in the memory 906 of the computer 902 using the relationships and logic that was generated using the compiler 912.

The computer 902 also optionally comprises an external communication device such as a modem, satellite link, Ethernet card, or other device for accepting input from and providing output to other computers.

In one embodiment, instructions implementing the operating system 908, the computer program 910, and/or the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, or a flash drive. Further, the operating system 908 and the computer program 910 are comprised of computer program instructions which, when accessed, read and executed by the computer 902, causes the computer 902 to perform the steps necessary to implement and/or use the present invention or to load the program of instructions into a memory, thus creating a special purpose data structure causing the computer to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 902.

Furthermore, the operations performed in FIGS. 3, 4, 6 and 6 can be performed by processor communicatively coupled to memory storing instructions for performing said operations. For example, the processor 226 shown in FIG. 2 may perform instructions stored in memory 232 to compute and/or compute and insert the watermark into media program frames as described above. Further, video and audio processors 212 and 216 may include processors that execute instructions stored in internal memory or the associated RAM 214, 218 to perform some or all of the described operations.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of adding watermark data to a media program in a receiver, comprising the steps of:
    (a) receiving data comprising the media program in the receiver disposed at a subscriber station;
    (b) generating, at least in part with a secure data processor executing instructions permanently and unchangeably coded into a secure memory of the secure data processor, a watermark, wherein the watermark is generated at least in part according to an identifier uniquely associated with and securely stored in the secure data processor;
    (c) processing the received data to reproduce the media program; and
    (d) inserting portions of the generated watermark in the reproduced media program at locations determined at least in part according to the secure data processor-unique identifier to produce a watermarked media program provided for display, comprising:
        (d)(1) inserting a first portion of the portions of the generated watermark in a first portion of a first frame of the reproduced media program;
        (d)(2) inserting a further portion of the portions of the generated watermark in a further portion of a subsequent frame of the media program, wherein at least one of the subsequent frame of the media program and a location of the further portion of the generated watermark within the subsequent frame of the reproduced media program is selected at least in part according to the secure data processor-unique identifier;
        (d)(3) repeating (d)(2) until all of the generated watermark is inserted in the media program; and
        (d)(4) repeating (d)(1)-(d)(3) to insert the generated watermark in further frames of the media program.

2. The method of claim 1, wherein the subsequent frame of the media program is selected at least in part according to the secure data processor-unique identifier.

3. The method of claim 2, wherein the first portion of the first frame is disposed in a same relative location in the first frame as the further portion of the subsequent frame.

4. The method of claim 1, wherein the location of the further portion of the generated watermark within the subsequent frame of the reproduced media program is selected at least in part according to the secure data processor-unique identifier.

5. The method of claim 1, wherein a size of the first portion of the generated watermark and a size of the further portion of the generated watermark differ.

6. The method of claim 1, wherein the first portion of the generated watermark and the further portion of the generated watermark are of a same size determined at least in part according to the secure data processor-unique identifier.

7. The method of claim 6, wherein the size is determined at least in part according to the secure data processor-unique identifier and a secret value.

8. The method of claim 1, wherein the generated watermark comprises a plurality of bits and the first portion of the generated watermark comprises a least significant bit of the plurality of bits.

9. The method of claim 1, wherein the first portion of the first frame of the reproduced media program comprises frame data, and the generated watermark replaces one or more least significant bits of the frame data.

10. The method of claim 9 above, wherein the frame data is one of:
color data;
luminance data;
hue data;
chrominance data; and
intensity data.

11. The method of claim 1, wherein:
(d)(1) inserting a first portion of the portions of the generated watermark in a first portion of a first frame of the reproduced media program comprises:
inserting a first character or first symbol mapped to a value of the first portion of the generated watermark; and
(d)(2) inserting a further portion of the portions of the generated watermark in a further portion of a subsequent frame of the media program comprises:
inserting a further character or further symbol mapped to a value of the further portion of the generated watermark in the further portion of the subsequent frame of the media program.

12. The method of claim 1, wherein:
the media program comprises a plurality of frames; and
each of the portions of the watermark are inserted into an associated one of the plurality of frames according to a deterministic interval.

13. The method of claim 12, further comprising the steps of:
searching for and reading the inserted first portion of the portions of the generated watermark in the first frame of the reproduced media program;
searching for and reading the inserted further portion of the portions of the generated watermark in the subsequent frame of the reproduced media program; and
combining the read first portion and the read further portion to recover at least a portion of the inserted watermark.

14. The method of claim 1, wherein the at least one of the subsequent frame of the media program and a location of the further portion of the generated watermark within the subsequent frame of the reproduced media program is further selected at least in part according to a secret value.

15. The method of claim 14, wherein:
the step of (b) generating the watermark comprises the steps of:
(b)(1) combining the secure data processor-unique identifier and the secret value to create a receiver-unique value;
(b)(2) generating a header comprising a start of frame marker; and
(b)(3) combining the header and the receiver-unique value to produce the generated watermark.

16. The method of claim 15, wherein:
the step (b)(1) of combining the secure data processor-unique identifier and the secret value to create a receiver-unique value comprises the step of encrypting the secure data processor-unique identifier according to the secret value to create a receiver-unique value; and
the step (b)(2) of combining the header and the receiver-unique value to produce the generated watermark comprises the step of concatenating the header and the receiver-unique value to produce the generated watermark.

17. The method of claim 15, further comprising:
(e) searching for and reading a start of frame maker in the media program to find the first portion of the generated watermark;
(f) searching for and reading the subsequent frame of the media program for the further portion of the generated watermark;
(g) concatenating the first portion of the generated watermark and the further portion of the generated watermark;
(h) repeating steps (e)-(g) until the generated watermark is regenerated; and
(i) reproducing the secure data processor-unique identifier from the regenerated watermark.

18. An apparatus for adding watermark data to a media program comprising:
a tuner for receiving data comprising the media program in the receiver disposed at a subscriber station; and
a secure data processor, communicatively coupled to the tuner, the secure data processor executing instructions permanently and unchangeably coded into a secure memory of the secure data processor, the instructions comprising instructions for:
(a) generating, at least in part with a secure data processor executing instructions permanently and unchangeably coded into a secure memory of the secure data processor, a watermark, wherein the watermark is generated at least in part according to an identifier uniquely associated with and securely stored in the secure data processor;
(b) processing the received data to reproduce the media program; and
(c) inserting portions of the generated watermark in the reproduced media program at locations determined at least in part according to the secure data processor-unique identifier to produce a watermarked media program provided for display, comprising:
(c)(1) inserting a first portion of the portions of the generated watermark in a first portion of a first frame of the reproduced media program;
(c)(2) inserting a further portion of the portions of the generated watermark in a further portion of a subsequent frame of the media program, wherein at least one of the subsequent frame of the media program and a location of the further portion of the generated watermark within the subsequent frame of the reproduced media program is selected at least in part according to the secure data processor-unique identifier;
(c)(3) repeating (c)(2) until all of the generated watermark is inserted in the media program; and
(d)(4) repeating (d)(1)-(d)(3) to insert the generated watermark in further frames of the media program.

19. The apparatus of claim 18, wherein the subsequent frame of the media program is selected at least in part according to the secure data processor-unique identifier.

20. The apparatus of claim 19, wherein the first portion of the first frame is disposed in a same relative location in the first frame as the further portion of the subsequent frame.

21. The apparatus of claim 18, wherein the location of the further portion of the generated watermark within the subsequent frame of the reproduced media program is selected at least in part according to the secure data processor-unique identifier.

22. The apparatus of claim 18, wherein a size of the first portion of the generated watermark and a size of the further portion of the generated watermark differ.

23. The apparatus of claim 18, wherein the first portion of the generated watermark and the further portion of the generated watermark are of a same size determined at least in part according to the secure data processor-unique identifier.

24. The apparatus of claim 23, wherein the size is determined at least in part according to the secure data processor-unique identifier and a secret value.

25. The apparatus of claim 18, wherein the generated watermark comprises a plurality of bits and the first portion of the generated watermark comprises a least significant bit of the plurality of bits.

26. The apparatus of claim 18, wherein the first portion of the first frame of the reproduced media program comprises frame data, and the generated watermark replaces one or more least significant bits of the frame data.

27. The apparatus of claim 26, wherein the frame data is one of:
color data;
luminance data;
hue data;
chrominance data; and
intensity data.

28. The apparatus of claim 18, wherein:
the instructions for inserting a first portion of the portions of the generated watermark in a first portion of a first frame of the reproduced media program comprises instructions for:
inserting a first character or first symbol mapped to a value of the first portion of the generated watermark; and
the instructions for inserting a further portion of the portions of the generated watermark in a further portion of a subsequent frame of the media program comprises instructions for:
inserting a further character or further symbol mapped to a value of the further portion of the generated watermark in the further portion of the subsequent frame of the media program.

29. The apparatus of claim 18, wherein:
the media program comprises a plurality of frames; and
each of the portions of the watermark are inserted into an associated one of the plurality of frames according to a deterministic interval.

30. The apparatus of claim 29, further comprising:
a second processor, communicatively coupled to a second memory storing second processor instructions for:
searching for and reading the inserted first portion of the portions of the generated watermark in the first frame of the reproduced media program;
searching for and reading the inserted further portion of the portions of the generated watermark in the subsequent frame of the reproduced media program; and
combining the read first portion and the read further portion to recover at least a portion of the inserted watermark.

31. The apparatus of claim 18, wherein the at least one of the subsequent frame of the media program and a location of the further portion of the generated watermark within the subsequent frame of the reproduced media program is further selected at least in part according to a secret value.

32. The apparatus of claim 31, wherein:
the instructions for generating the watermark comprise instructions for:
combining the secure data processor-unique identifier and the secret value to create a receiver-unique value;
generating a header comprising a start of frame marker; and
combining the header and the receiver-unique value to produce the generated watermark.

33. The apparatus of claim 32, wherein:
the instructions for combining the secure data processor-unique identifier and the secret value to create a receiver-unique value comprises instructions for encrypting the secure data processor-unique identifier according to the secret value to create a receiver-unique value; and
the instructions for combining the header and the receiver-unique value to produce the generated watermark comprises instructions for concatenating the header and the receiver-unique value to produce the generated watermark.

34. The apparatus of claim 32, further comprising:
a second processor, communicatively coupled to a second memory storing second processor instructions for:
(e) searching for and reading a start of frame maker in the media program to find the first portion of the generated watermark;
(f) searching for and reading the subsequent frame of the media program for the further portion of the generated watermark;
(g) concatenating the first portion of the generated watermark and the further portion of the generated watermark;
(h) repeating steps (e)-(g) until the generated watermark is regenerated; and
(i) reproducing the secure data processor-unique identifier from the regenerated watermark.

35. A system for adding watermark data to a media program in a receiver, comprising:
means for receiving data comprising the media program in the receiver disposed at a subscriber station;
means for generating, at least in part with a secure data processor executing instructions permanently and unchangeably coded into a secure memory of the secure data processor, a watermark, wherein the watermark is generated at least in part according to an identifier uniquely associated with and securely stored in the secure data processor;
means for processing the received data to reproduce the media program; and
means for inserting portions of the generated watermark in the reproduced media program at locations determined at least in part according to the secure data processor-unique identifier to produce a watermarked media program provided for display, comprising:
means for inserting a first portion of the portions of the generated watermark in a first portion of a first frame of the reproduced media program; and
means for inserting a further portion of the portions of the generated watermark in a further portion of a subsequent frame of the media program, wherein at least one of the subsequent frame of the media program and a location of the further portion of the generated watermark within the subsequent frame of the reproduced media program is selected at least in part according to the secure data processor-unique identifier.

* * * * *